(12) United States Patent
Zsido et al.

(10) Patent No.: US 11,661,285 B2
(45) Date of Patent: May 30, 2023

(54) MANUALLY-ADJUSTABLE LIFTER APPARATUS FOR CONVEYOR BELTS

(71) Applicant: ASGCO Manufacturing, Inc., Nazareth, PA (US)

(72) Inventors: Justin L. Zsido, Bethlehem, PA (US); Andrew M. Collier, Whitehall, PA (US); Leroy C. Williams, Hellertown, PA (US)

(73) Assignee: ASGCO MANUFACTURING, INC., Nazareth, PA (US)

( * ) Notice: Subject to any disclaimer, the term of this patent is extended or adjusted under 35 U.S.C. 154(b) by 0 days.

(21) Appl. No.: 17/497,255

(22) Filed: Oct. 8, 2021

(65) Prior Publication Data

US 2022/0135338 A1 May 5, 2022

Related U.S. Application Data

(63) Continuation of application No. 17/085,254, filed on Oct. 30, 2020, now Pat. No. 11,242,204.

(51) Int. Cl.
*B65G 21/10* (2006.01)
*B66F 3/46* (2006.01)
(Continued)

(52) U.S. Cl.
CPC ............... *B65G 21/10* (2013.01); *B66F 3/10* (2013.01); *B66F 3/46* (2013.01); *B65G 15/08* (2013.01); *B65G 2207/30* (2013.01)

(58) Field of Classification Search
CPC .... B65G 21/10; B65G 15/08; B65G 2207/30; B66F 3/10; B66F 3/46
(Continued)

(56) References Cited

U.S. PATENT DOCUMENTS

| 1,705,558 A | 3/1929 | Cuddihy |
| 1,963,099 A | 6/1934 | Robins |

(Continued)

FOREIGN PATENT DOCUMENTS

| KR | 10-0762439 | 10/2007 |
| KR | 10-1491448 | 2/2015 |

(Continued)

OTHER PUBLICATIONS

English abstract of KR 10-0762439.
(Continued)

*Primary Examiner* — James R Bidwell
(74) *Attorney, Agent, or Firm* — Caesar Rivise, PC (57) ABSTRACT

An apparatus/method for a conveyor belt lifter apparatus that can be manually-configured to accommodate differently-sized conveyor belts of conveyor systems. The apparatus includes a pair of lifts in between which a trough-shaped adjustable conveyor belt support arm is releasably-secured. An adjustable shaft coupler connects the lifts to allow simultaneous activation and movement of both lifts by an operator engaging only one lift. An adjustable base also allows the apparatus to be adjusted for the conveyor system size. These adjustable components comprise segments that can be releasably secured using quick-release pins. The height of the ends of the conveyor belt support arm can also be manually adjusted to eliminate any gap between the conveyor belt and the support arm before lift activation. Each lift comprises a manually-controlled screw jack with an extender formed thereon to allow the lifter apparatus to raise or lower the particular conveyor belt once the lifter apparatus is installed.

3 Claims, 11 Drawing Sheets

(51) Int. Cl.
*B66F 3/10* (2006.01)
*B65G 15/08* (2006.01)

(58) Field of Classification Search
USPC .................................... 198/818–830, 861.1
See application file for complete search history.

(56) References Cited

U.S. PATENT DOCUMENTS

| | | | |
|---|---|---|---|
| 2,225,276 | A | 12/1940 | Parker |
| 2,514,715 | A | 7/1950 | Milik |
| 2,561,641 | A | 7/1951 | Thomson |
| 2,815,851 | A | 12/1957 | Yoshimura |
| 5,657,857 | A | 8/1997 | Neilson et al. |
| 6,109,428 | A | 8/2000 | Harm |
| 6,173,830 | B1 | 1/2001 | Cumberlege et al. |
| 6,193,052 | B1 | 2/2001 | Cloud et al. |
| 6,244,428 | B1 * | 6/2001 | Atkins ................ B65G 21/06 198/841 |
| 6,248,428 | B1 | 6/2001 | Asai et al. |
| 6,405,854 | B1 | 6/2002 | Cumberlege |
| 6,581,749 | B2 | 6/2003 | Wood et al. |
| 7,810,788 | B2 | 10/2010 | DeVries |
| 7,905,341 | B1 | 3/2011 | Veno et al. |
| 8,186,651 | B2 | 5/2012 | Dowling |
| 8,342,361 | B2 | 1/2013 | Cooper et al. |
| 9,260,247 | B2 | 2/2016 | Miller et al. |
| 9,428,372 | B2 | 8/2016 | Arif |
| 9,469,480 | B2 | 10/2016 | Gibbs et al. |
| 9,682,824 | B2 | 6/2017 | Peters et al. |
| 9,856,088 | B1 | 1/2018 | Riggs |
| 10,071,860 | B2 | 9/2018 | Kahrger et al. |
| 10,384,873 | B2 | 8/2019 | Kilibarda et al. |
| 10,595,463 | B2 | 3/2020 | Walker |
| 10,974,903 | B2 | 4/2021 | Wood et al. |
| 10,974,906 | B2 | 4/2021 | Borghoff |
| 11,242,204 | B1 * | 2/2022 | Zsido .................... B65G 21/10 |
| 2008/0060909 | A1 | 3/2008 | DeVries |
| 2014/0083822 | A1 | 3/2014 | Swinderman et al. |
| 2015/0157917 | A1 | 6/2015 | Gennario, Jr. |
| 2020/0024089 | A1 | 1/2020 | Brunone |

FOREIGN PATENT DOCUMENTS

| | | |
|---|---|---|
| KR | 101812072 B1 | 12/2017 |
| WO | WO 2008/128291 | 10/2008 |
| WO | WO 2012/083388 A1 | 6/2012 |
| WO | WO 2015/024072 A1 | 2/2015 |

OTHER PUBLICATIONS

English abstract of KR 10-1491448.
International Search Report for corresponding PCT Application No. PCT/US2021/056542 dated Feb. 9, 2022.
"Operations & Maintenance Manual, Portable Hydraulic Trough Conveyor Belt Lifter", Techmine Solutions, 2019.
English Abstract of KR101812072B1.

* cited by examiner

MANUALLY-ADJUSTABLE LIFTER APPARATUS FOR CONVEYOR BELTS

CROSS-REFERENCE TO RELATED APPLICATIONS

This Continuation Application claims the benefit under 35 U.S.C. § 120 of application Ser. No. 17/085,254 filed on Oct. 30, 2020, entitled MANUALLY-ADJUSTABLE LIFTER APPARATUS FOR CONVEYOR BELTS and whose entire disclosure is incorporated by reference herein.

BACKGROUND OF THE INVENTION

The present invention relates to relates generally to conveyor belt systems and more particularly, to an apparatus and method for manually-adjusting the width of a lifting device for accommodating conveyor belts of different widths during their maintenance.

Conveyor belts are used in a variety of industries to transport materials from one place to another. Generally, materials are deposited at one end of a conveyor and are transported to the other end, where they are discharged or otherwise removed from the conveyor belt. To assist in containing the material upon the conveyor belt during transport, the conveyor belt can be formed into a trough configuration. This is typically accomplished via the use of a center roller having angled idlers on each side of the center roller (see U.S. Pat. No. 9,469,480 (Gibbs) and U.S. Pat. No. 2,225,276 (Parker)) or by having a Y-shaped support having idlers on each leg of the upper portion of the "Y" (see U.S. Pat. No. 6,405,854 (Cumberlege)). See also U.S. Pat. No. 1,705,558 (Cuddihy); U.S. Pat. No. 1,963,099 (Robins); U.S. Pat. No. 2,561,641 (Thomson); U.S. Pat. No. 2,815,851 (Yoshimura) and U.S. Pat. No. 6,173,830 (Cumberlege, et al.).

Additionally, when it becomes necessary to conduct maintenance on different portions of the conveyer belt system or the belt itself, it is necessary lift a portion the conveyor belt off of the belt system, viz., off of the idler devices upon which the belt rides during normal operation. Examples of such devices are disclosed in U.S. Pat. No. 6,109,428 (Harm); U.S. Pat. No. 6,193,052 (Cloud, et al.); U.S. Pat. No. 6,248,428 (Atkins); U.S. Pat. No. 8,186,651 (Dowling); U.S. Pat. No. 7,810,788 (DeVries); U.S. Pat. No. 7,905,341 (Veno); U.S. Pat. No. 9,260,247 (Miller, et al.); U.S. Pat. No. 9,428,372 (Arif); U.S. Pat. No. 9,682,824 (Peters, et al.); U.S. Pat. No. 10,071,860 (Kahrger, et al.); and U.S. Pat. No. 10,384,873 (Kilibarda, et al.).

While the devices disclosed in the aforementioned publications may be generally suitable for their intended purposes, these devices do not allow for manual adjustment for accommodating troughed conveyor belts of different widths. Thus, there remains a need for a conveyor belt lifter device that can be manually-adjusted to accommodate troughed conveyor belts of different widths.

All references cited herein are incorporated herein by reference in their entireties.

BRIEF SUMMARY OF THE INVENTION

An apparatus for lifting a portion of trough-shaped conveyor belts of different widths when each trough-shaped conveyor belt is installed in a conveyor system is disclosed. The apparatus comprises: a conveyor belt support arm for receiving a trough-shaped conveyor belt thereon, wherein the conveyor belt support arm has a length that is manually-adjustable for accommodating trough-shaped conveyor belts of different widths; a pair of lifts wherein a respective lift is coupled to a respective end of the conveyor belt support arm for raising or lowering the conveyor belt support arm; a shaft coupler connected between the pair of lifts for permitting activation of one of the pair of lifts to activate the other one of the pair of lifts simultaneously so that the lifts raise or lower together, and wherein the shaft coupler is manually-adjustable; and a base to which the pair of lifts is coupled, the base being manually-adjustable to rest on a portion of the conveyor system.

A method of raising or lowering a portion of trough-shaped conveyor belts of different widths when each trough-shaped conveyor belt is installed in a conveyor system, said method comprising: forming a trough-shaped conveyor belt support arm having a length that is manually adjustable to accommodate trough-shaped conveyor belts of different widths; releasably coupling respective ends of the trough-shaped conveyor belt support arm to a respective lift; coupling an adjustable shaft between the lifts to allow the activation of one lift to simultaneously drive the other lift in a similar manner; connecting each lift to an adjustable base; adjusting the trough-shaped conveyor belt support arm, the adjustable shaft and the adjustable base to accommodate a width of a particular trough-shaped conveyor belt; positioning the base on a portion of the conveyor system and under the conveyor belt so that the troughed-shaped conveyor belt is resting on top of the trough-shaped conveyor belt arm; and activating one of the lifts to either raise or lower the conveyor belt.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

As discussed in the Background, trough-shape conveyor belts come in different widths, such as but not limited to the following conveyor belt sizes (T indicating "ton"):

1 T: 36", 42", 48"
1.5 T: 48", 54", 60"
2 T: 72", 84", 96"

It is thus desirable to have a single conveyor belt lifting apparatus that can be accommodate all of these. The width W of the conveyor belt 10 is shown most clearly in FIG. 1.

Figure 1:
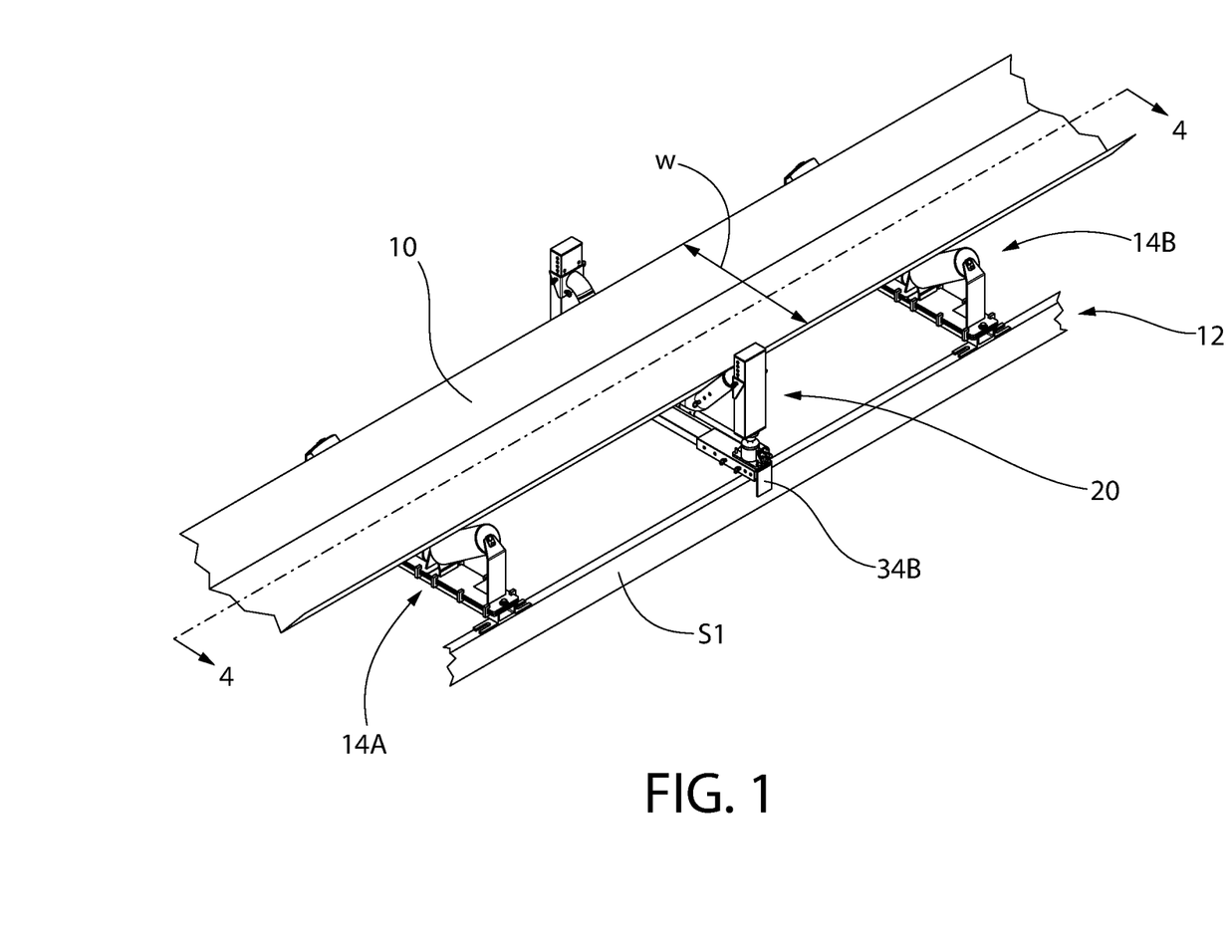
FIG. 1 is a partial isometric view of a conveyor belt system depicting the manually-adjustable lifter apparatus of the present invention inserted underneath a conveyor belt and positioned between two idler devices of the conveyor system.
Figure 2:
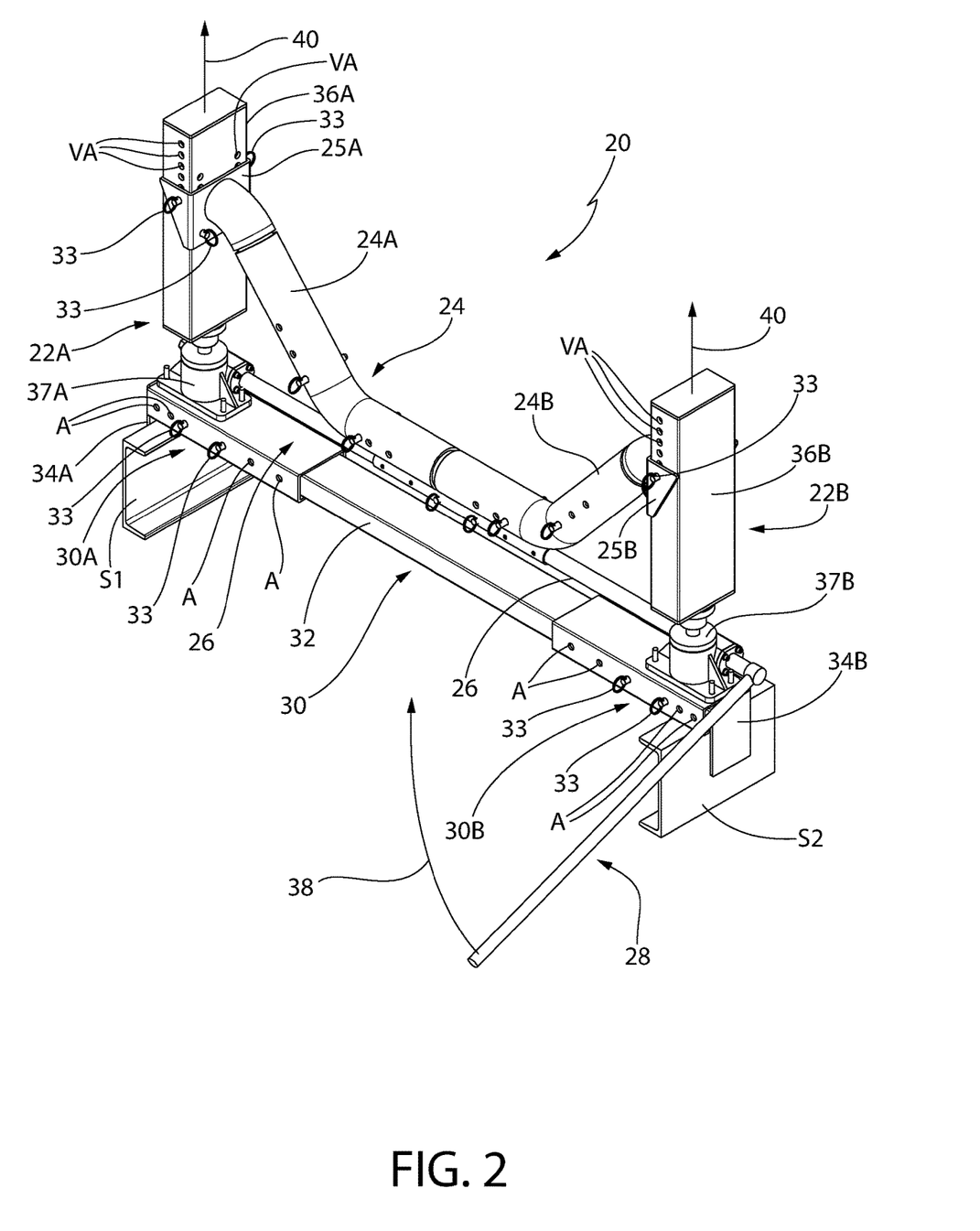
FIG. 2 is an isometric view of the manually-adjustable lifter apparatus of the present invention with a tool shown engaged with activation mechanism of the lifter apparatus to raise the conveyor belt support arm.
Figure 3:
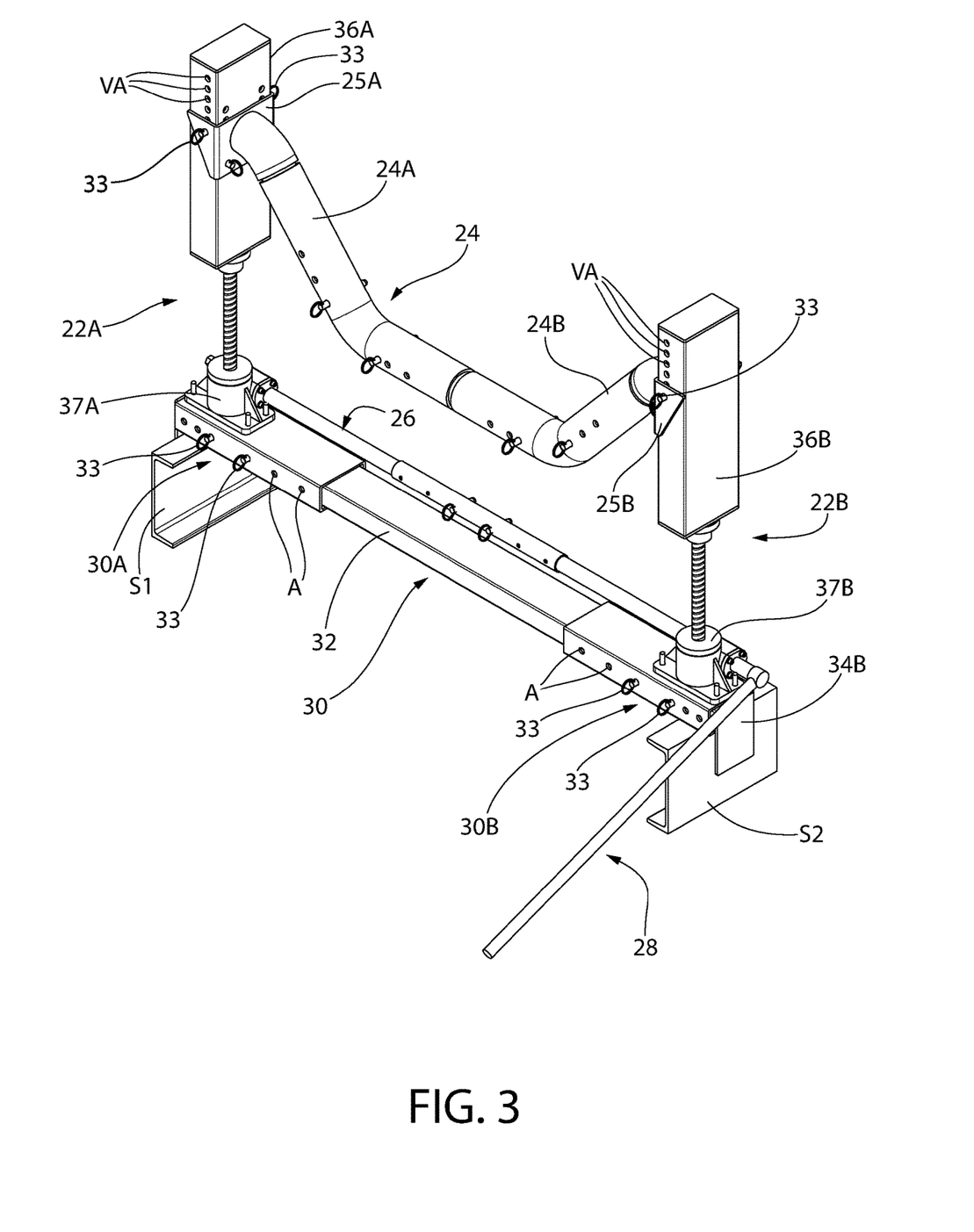
FIG. 3 is isometric view of the manually-adjustable lifter apparatus of FIG. 2 but showing the conveyor belt support arm in the raised position.

As shown most clearly in FIGS. 2-3, the adjustable lifter apparatus 20 for conveyor belts comprises a pair of lifts 22A and 22B between which is an adjustably-coupled "trough-shaped" conveyor belt support arm 24 for receiving the trough-shaped conveyor belt 10 (FIG. 1) thereon. Furthermore, an adjustable input shaft coupler 26 is also coupled between the two lifts 22A/22B; the input shaft coupler 26 allows the two lifts 22A/22B to be driven together when an operator engages a tool 28 with one of the lifts 22A/22B. The lifts 22A and 22B are mounted on an adjustable base 30 which then rests on a portion of the conveyor system 12 (FIG. 1), typically stringers S1 and S2, when the lifter apparatus 20 is in use.

The adjustable base 30 comprises base sleeves 30A and 30B, to which a respective lift 22A and 22B is secured. Each base sleeve 30A/30B is releasably secured over a base bar 32 using a plurality of quick-release pins 33 that pass through apertures A in the base sleeves 30A/30B. Each base sleeve 30A and 30B comprises a respective stop 34A and 34B. When the lifter apparatus 20 is to be used, the apparatus 20 is positioned on the conveyor system frame 12, namely on respective conveyor system stringers S1 and S2, and the two stops 34A/34B prevent the apparatus 20 from sliding off of the stringers S1 and S2 during use. The adjustable base 30 and all of its components may be formed of steel.

Figure 6:
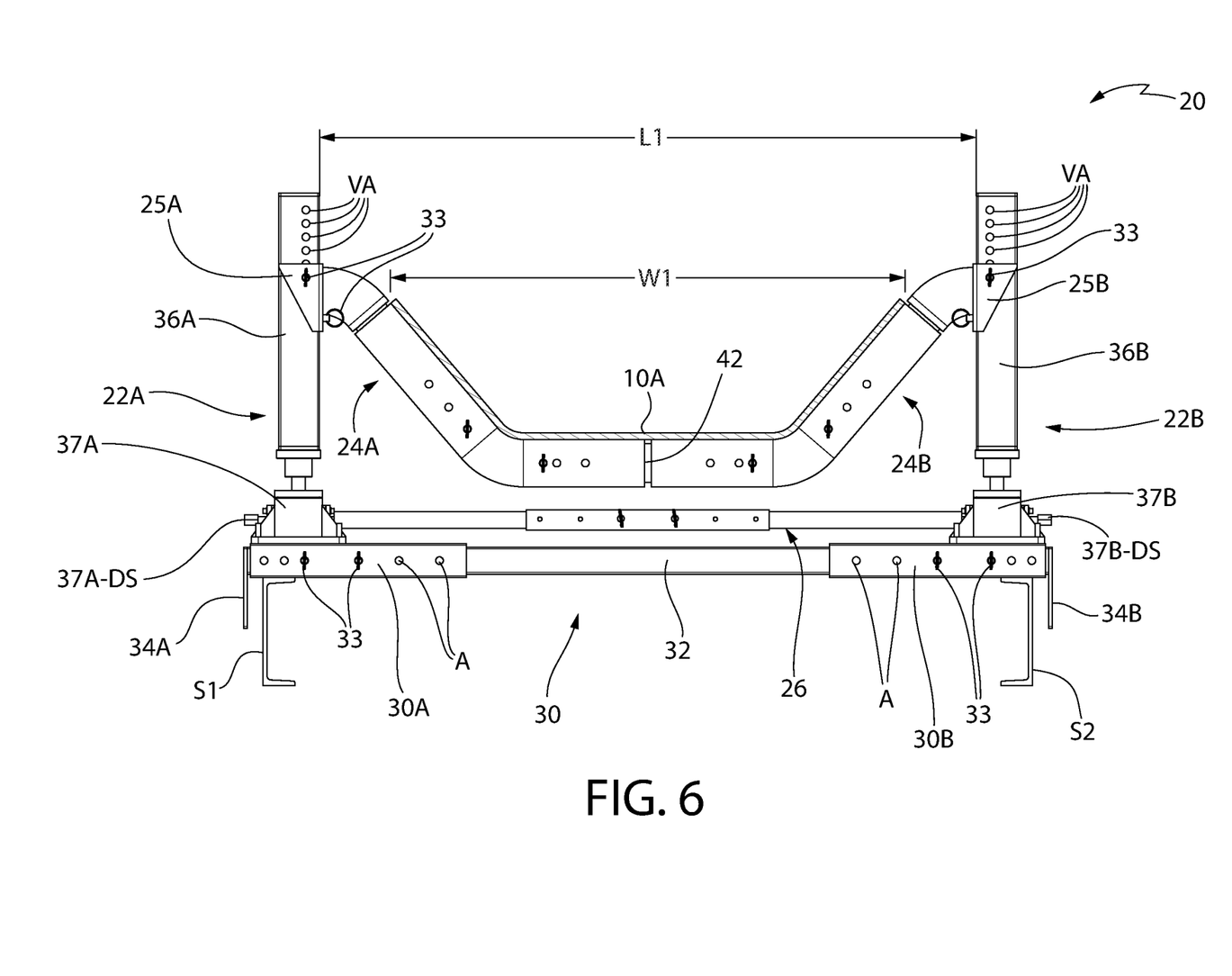
FIG. 6 is a plan view of the manually-adjustable lifter apparatus shown with the conveyor belt support arm in its retracted or lowered position with a first conveyor belt thereon.
Figure 7:
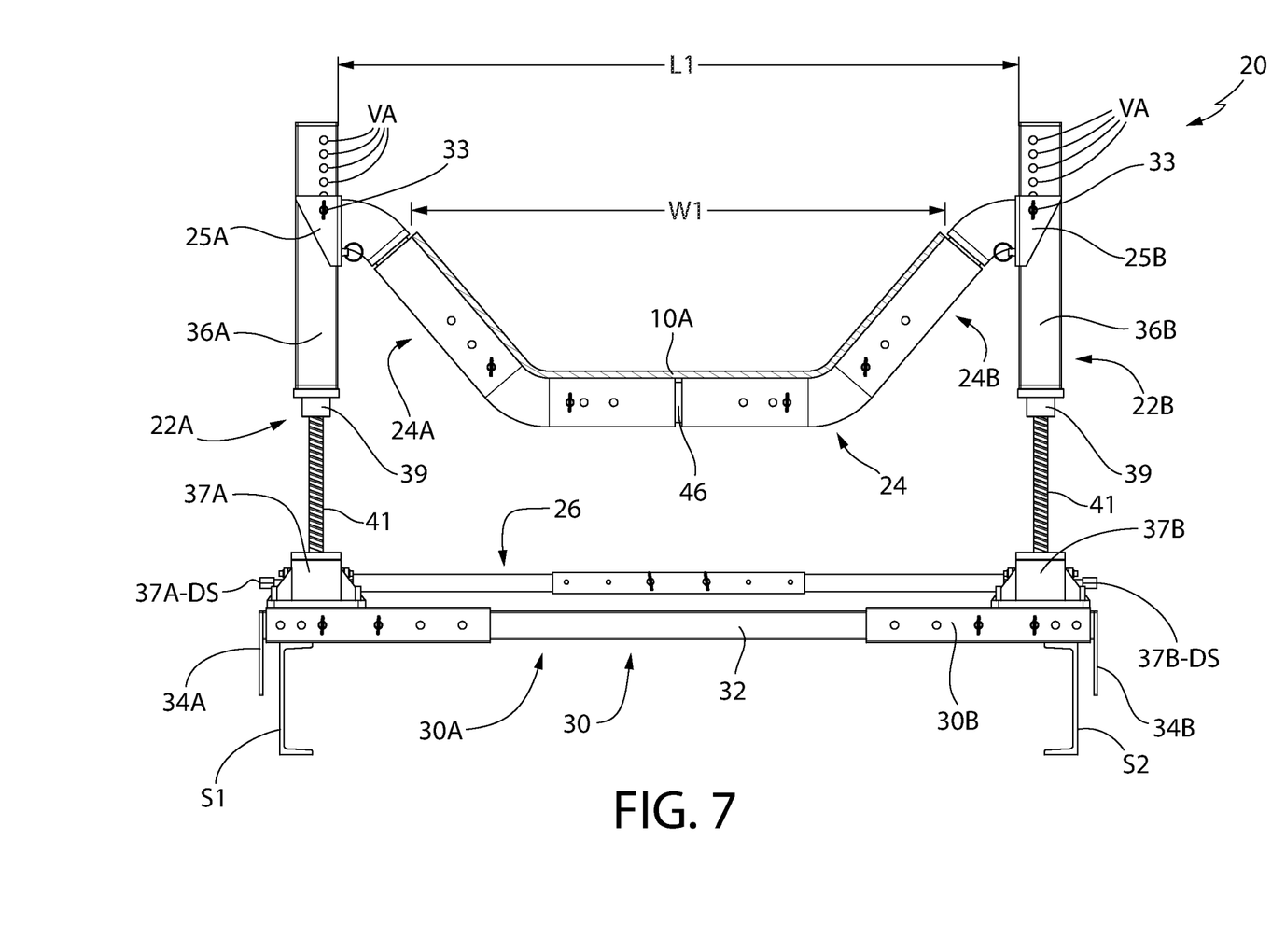
FIG. 7 is a plan view of the manually-adjustable lifter apparatus shown with the conveyor belt support arm in its extended or raised position with the first conveyor belt thereon.
Figure 8:
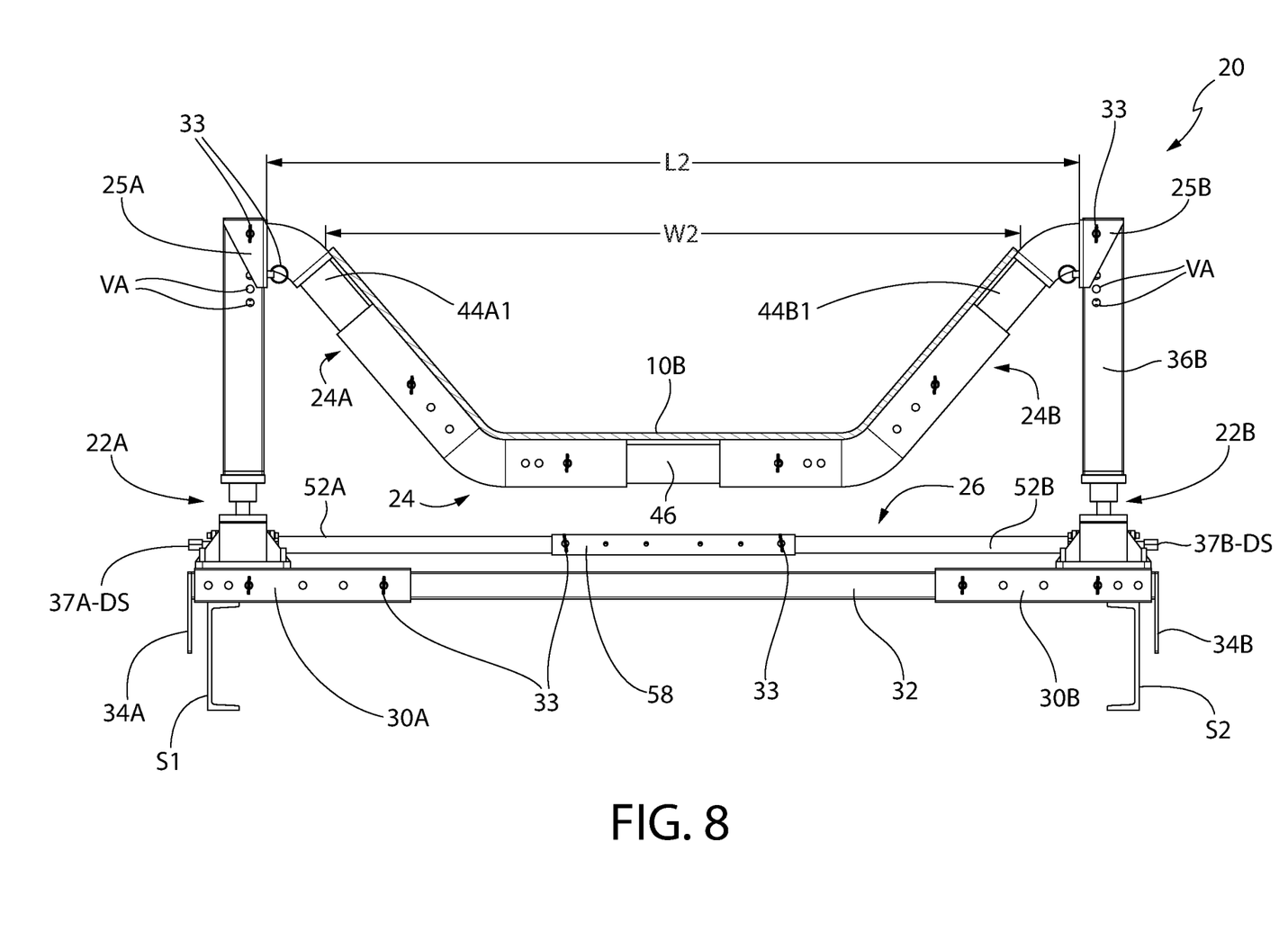
FIG. 8 is a plan view of the manually-adjustable lifter apparatus after it has been adjusted to accommodate a second conveyor belt which has a width that is larger than the first conveyor belt shown in FIGS. 6-7 and showing the conveyor belt support arm in the retracted or lowered position.
Figure 9:
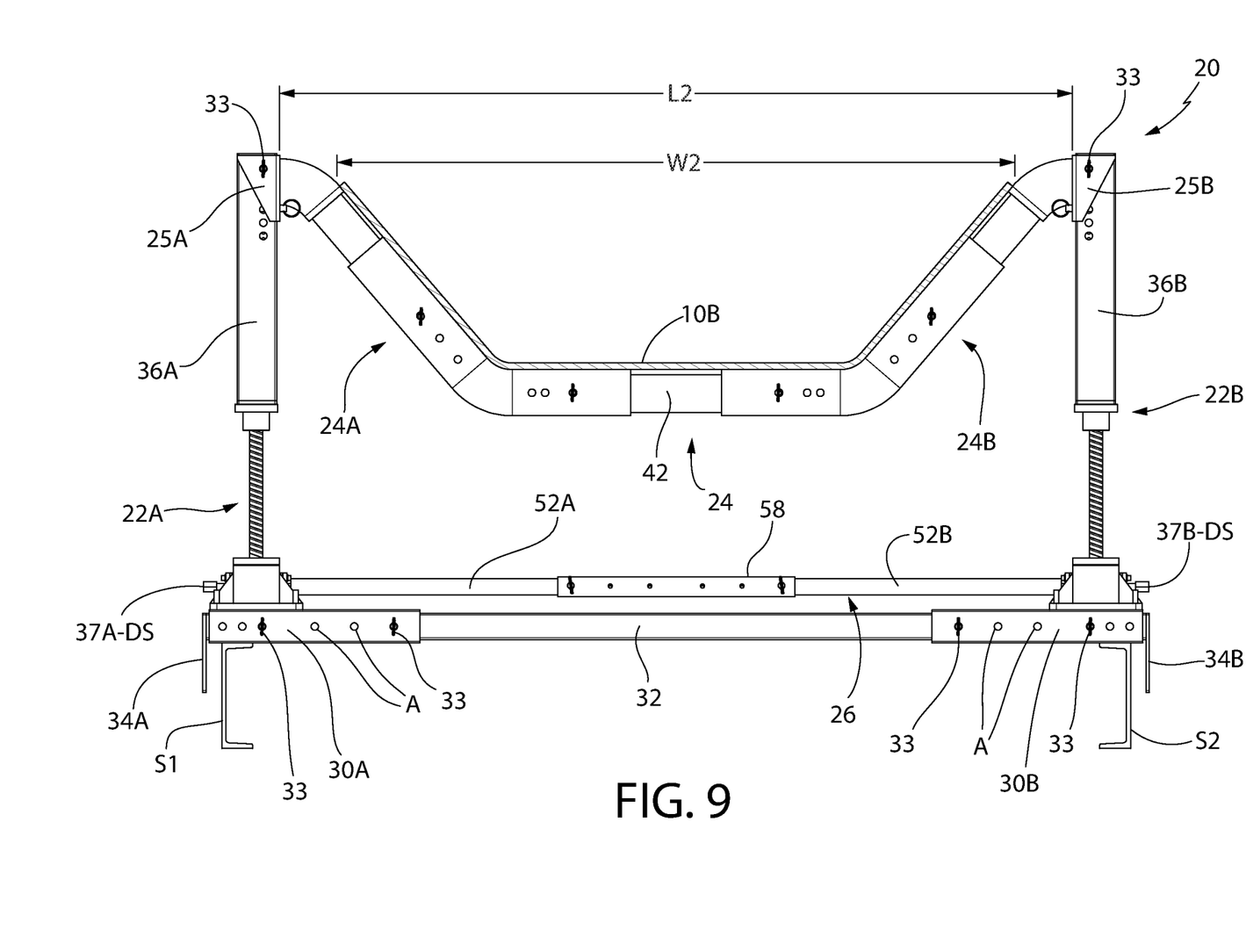
FIG. 9 is a plan view of the manually-adjustable lifter apparatus after it has been adjusted to accommodate the second conveyor belt and shown with the conveyor belt support arm in the extended or raised position.

Each lift 22A/22B comprises a respective lift extension 36A/36B for coupling to a respective connector 25A/25B of the conveyor belt support arm 24. Quick-release pins 33 are also used to releasably-secure the respective connectors 25A/25B to the respective lift extensions 36A/36B. Apertures VA in the extenders 36A/36B are vertically-arranged to allow the connectors 25A/25B to be coupled at a height that allows the conveyor belt support arm 24 to accommodate the width of the conveyor belt 10 thereon. The connectors 25A/25B and the lift extension 36A/36B provide an important feature of the lifter apparatus 20; namely, when the apparatus 20 is to be adjusted for a wider conveyor belt 10, the height of the angled portions 24A/24B of the support 24 must also be raised on the respective jack couplers 36A/36B to accommodate for the wider conveyor belt width. This can be seen by comparing FIGS. 6-7 which depict a conveyor belt 10A of a first width W1 while FIGS. 8-9 depict a second conveyor belt 10B of a second width W2 greater than the first width W1. Consequently, the length L2 (FIGS. 8-9) of the conveyor belt support arm 24 has been increased from the length L1 of the conveyor belt support arm 24 as shown in FIGS. 6-7. As such, the operator couples the connectors 25A/25B to the extenders 36A/36B at a height along the extenders 36A/36B to accommodate the particular width of the conveyor belt 10 to be raised by the lifter apparatus 20. The extenders 36A/36A may be formed of steel.

Each lift 22A/22B may comprise a screw jack that is manually-operated using the tool 28 to raise or lower the conveyor belt support arm 24. Alternatively, each lift 22A/22B may comprise a hydraulic cylinder that is automatically driven to raise or lower the conveyor belt support arm 24 but the preferred embodiment 20 uses screw jacks 37A and 37B. By way of example only, the screw jacks 37A/37B may comprise a Joyce WJT62 2-ton machine screw jack. An extender 36A and 36B is then added to the screw jack 37A/37B to allow the ends of the conveyor belt support arm 24 to be coupled to the lifters 22A/22B. By way of example also, the tool 28 may comprise an impact driver (e.g., cordless), ½" drive ratchet, air ratchet/impact driver, etc. or any tool having a hex head with a socket, etc.). The tool 28 is used to turn a respective drive screw 37A-DS or 37B-DS (see FIGS. 6-9). In FIGS. 2-3, the tool 28 is engaged with drive screw 37B-DS.

As can be seen in FIG. 2, when the tool 28 is engaged with either of the drive screws 37A-DS/37B-DS of the input shaft coupler 26 and rotated in the direction of the arrow 38, the lift extension 36A/36B are raised/extended in the direction of the arrows 40. Conversely, when the tool 28 is rotated in the direction opposite to arrow 38, the lift extensions 36A/36B are lowered/retracted in a direction opposite to the arrow 40. Thus, as can be seen, the lifter apparatus 20 is in the lower/retracted position in FIG. 2 whereas the lifter apparatus 20 is in the raised/extended position in FIG. 3.

Figure 10:
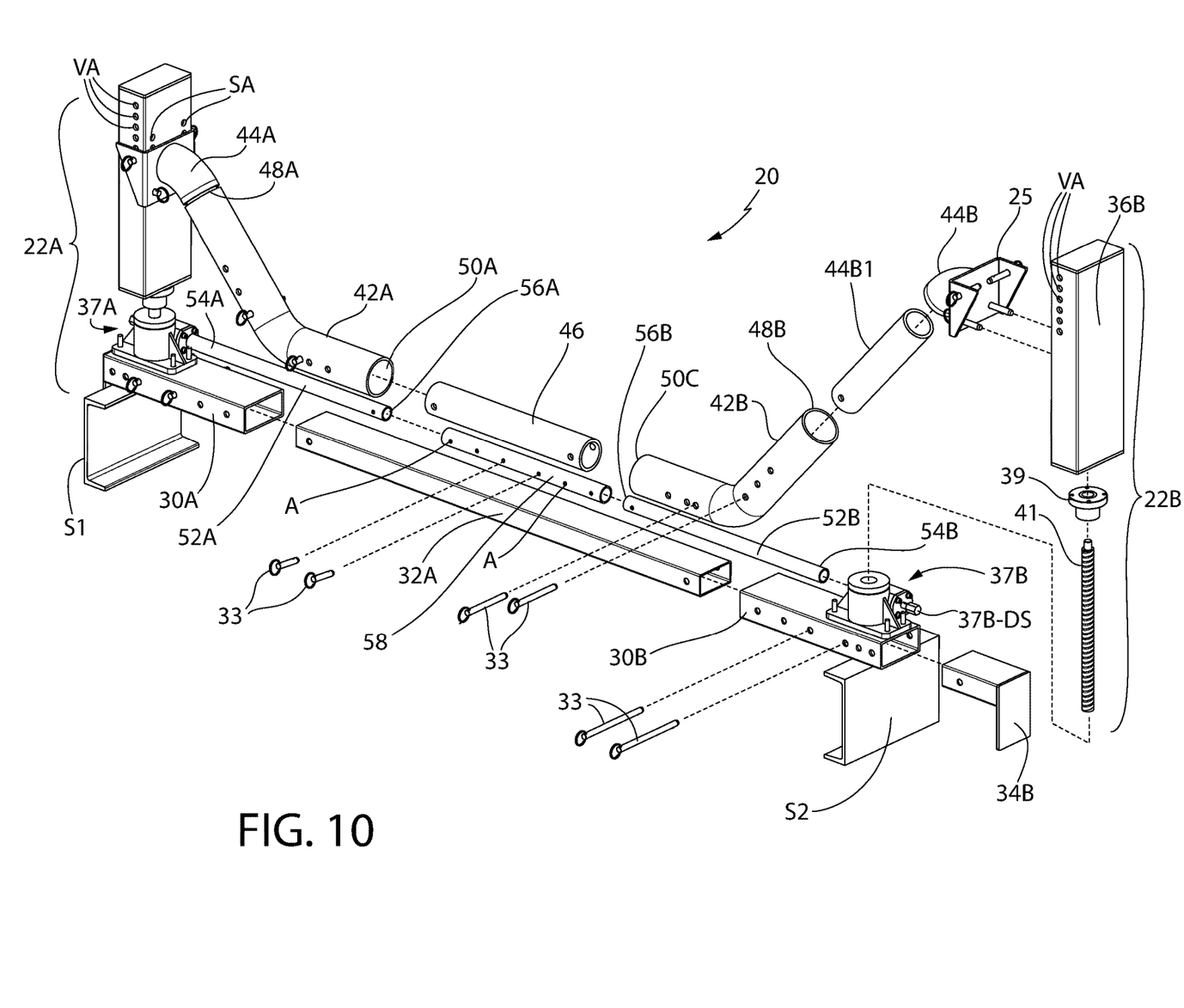
FIG. 10 is an exploded isometric view of the manually-adjustable lifter apparatus of the present invention.

As can be seen most clearly in FIG. 10, the conveyor belt support arm 24 comprises plurality of segments: a pair of hollow elbow elements 42A/42B, a pair of end elements 44A/44B and a central element 46. The pair of end elements 44A/44B each comprise an extension 44A1 (see FIGS. 8-9) and 44B1 that is slideably-engaged within a respective first end 48A/48B of the pair of elbow elements 42A/42B and the central element 46 is slidably-engaged within a respective second end 50A/50B of the pair of elbow elements 42A/42B. Quick-release pins 33 can then be passed through apertures A in the overlapping portions of these segments to releasably secure the conveyor belt support arm 24 to a particular length L to accommodate a conveyor belt 10 of a particular width W. It should be noted that each end element 44A/44B is fixed (e.g., welded) to its extension; as such, the extension 44B1 shown would be fixed (e.g., welded) to the end element 44B. Furthermore, these plurality of segments may be formed of aluminum.

As also shown most clearly in FIG. 10, the input shaft coupler 26 also comprises a plurality of segments that allows it to be properly adjusted: a pair of control shafts 52A/52B each of which have respective first ends 54A/54B coupled to their respective lifts 22A/22B and respective second ends that slideably engage within a central element 58 and wherein each of the control shafts 52A/52B is releasably coupled to the central element 58 when a quick-release pin 33 is passed through a respective aperture A in the respective second ends 56A/56B that align with apertures A in the central element 58. In addition, these plurality of segments of the input shaft coupler 26 may also be formed of aluminum.

It should be noted that the length L of the conveyor support arm 24 is similar to the length of the input shaft coupler 26 and the base 30 and that reference to the adjustment of the length of these portions of the lifter apparatus 20 is similar.

All of the apertures A depicted in the plurality of segments of the conveyor belt support arm 24, the input shaft coupler 26 and the base 30 are provided at predetermined increments to permit the conveyor belt support arm 24, the input shaft coupler 26 and the base 30 to be appropriately adjusted to accommodate the different-sized conveyor belts 10 mentioned earlier. Moreover, the vertically-arranged apertures VA shown in the extenders 36A and 36B are also located at predetermined increments to permit the height of the ends of the conveyor belt support arm 24 to be adjusted to accommodate the conveyor belts of different widths. As such, the displacement of the various segments and the insertion of the quick-release pins by an operator make the lifter apparatus 20 manually-adjustable.

As also shown in FIG. 10, movement of the lift 22A/22B upward or downward is explained via the nut 39 and threaded element 41 of screw jack 37B. The nut 39 is fixed to the bottom end of each extender 36A/36B, each of which are hollow. The threaded element 41 passes through and is in threaded engagement with the nut 39. Thus, when either of the drive screws 37A-DS/37B-DS is rotated, the threaded element 41 rotates, thereby causing the nut 39 to drive the corresponding extender 36A/36B up or down on the threaded element 41.

Figure 11:
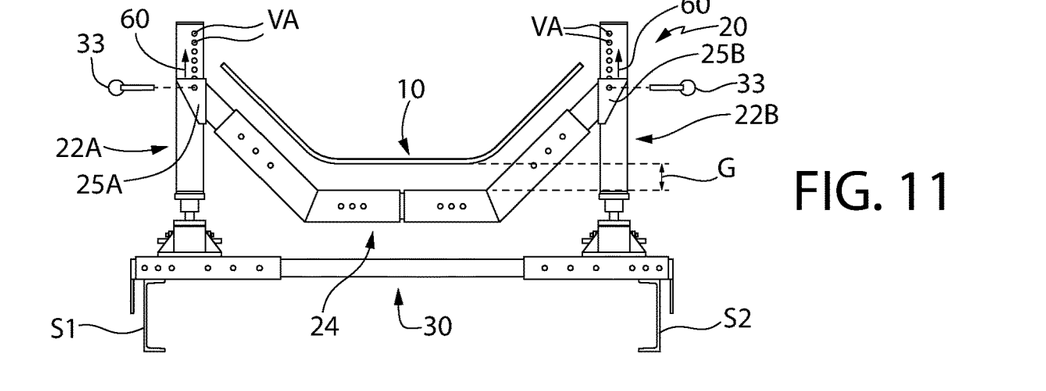
FIG. 11 is a plan view of the manually-adjustable lifter apparatus installed on the conveyor system but showing a gap between the conveyor belt and the lifter apparatus.
Figure 12:
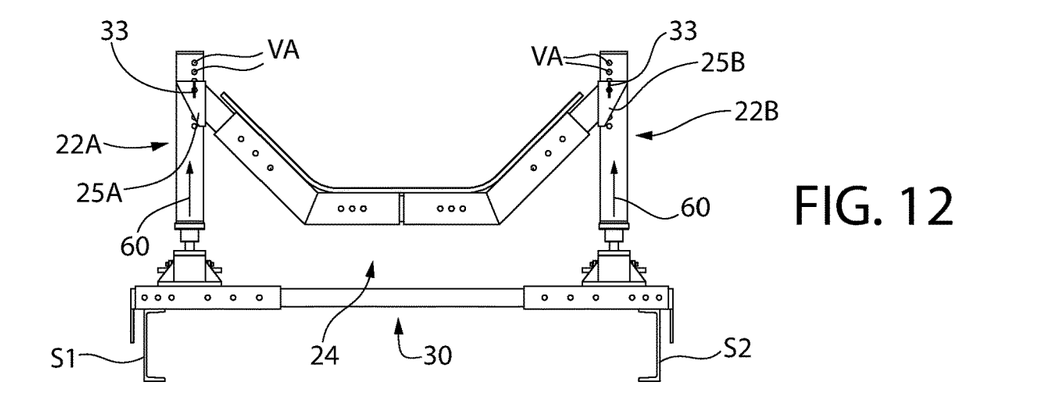
FIG. 12 is a plan view of the manually-adjustable lifter apparatus of FIG. 11 but shown after the respective connectors of the end elements have been adjusted upward to eliminate the gap.
Figure 13:
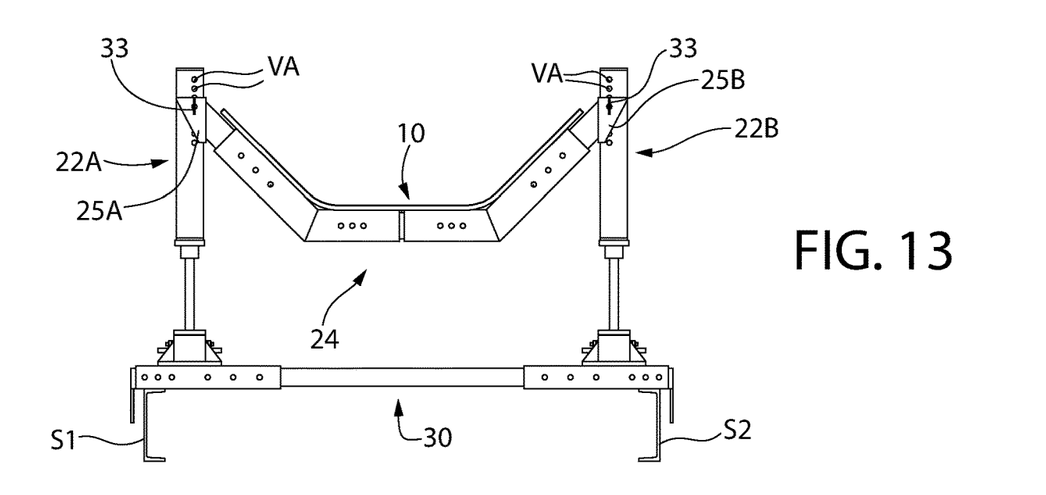
FIG. 13 is a plan view of the manually-adjustable lifter apparatus supporting the conveyor belt and wherein the full stroke of the lifts are being used to raise the conveyor belt without needing to first eliminate the gap.

It should be further understood that the ability to vertically adjust the connectors 25A/25B provides another unique feature that, to the best of Applicant's knowledge, is not available in conventional belt lifter devices. This feature can be seen most clearly in FIGS. 11-13. With the lifter apparatus 20 configured for a particular conveyor belt 10 width W, the lifter apparatus 20 is positioned underneath the conveyor belt 10 on stringers S1 and S2, in between conventional conveyor belt idlers 14A and 14B (as shown most clearly in FIG. 1). When initially positioned as such, there typically exists a gap G between the underside of the conveyor belt 10 and the conveyor belt support arm 24. With the ability to vertically adjust the connectors 25A/25B, the operator can remove the quick release pins 33 (only one of which is shown at each connector 25A/25B for clarity only) and move the connectors 25A/25B upward, in the direction shown by arrows 60 to bring the conveyor belt support arm 24 up into contact with the conveyor belt 10 (see FIG. 12), thereby eliminating the gap G; and then the operator can re-insert the quick-release pins 33 through the connectors 25A/25B and into the appropriate vertical apertures VA. With the conveyor belt 10 now in full contact with the conveyor belt support arm 24, the lifts 22A/22B can then be activated as described earlier, in the direction of arrows 60 (see FIG. 12), to raise the conveyor belt 10 to the desired height, as shown in FIG. 13. The ability to vertically adjust the connectors 25A/25B avoids the need to activate the lifts 22A/22B to remove the gap G and, as such, the entire stroke of the lifts 22A/22B can be reserved for actually lifting the conveyor belt 10. This can be an important feature where every increment of lift is used to raise the conveyor belt 10 to a maximum height, when required.

Figure 4:
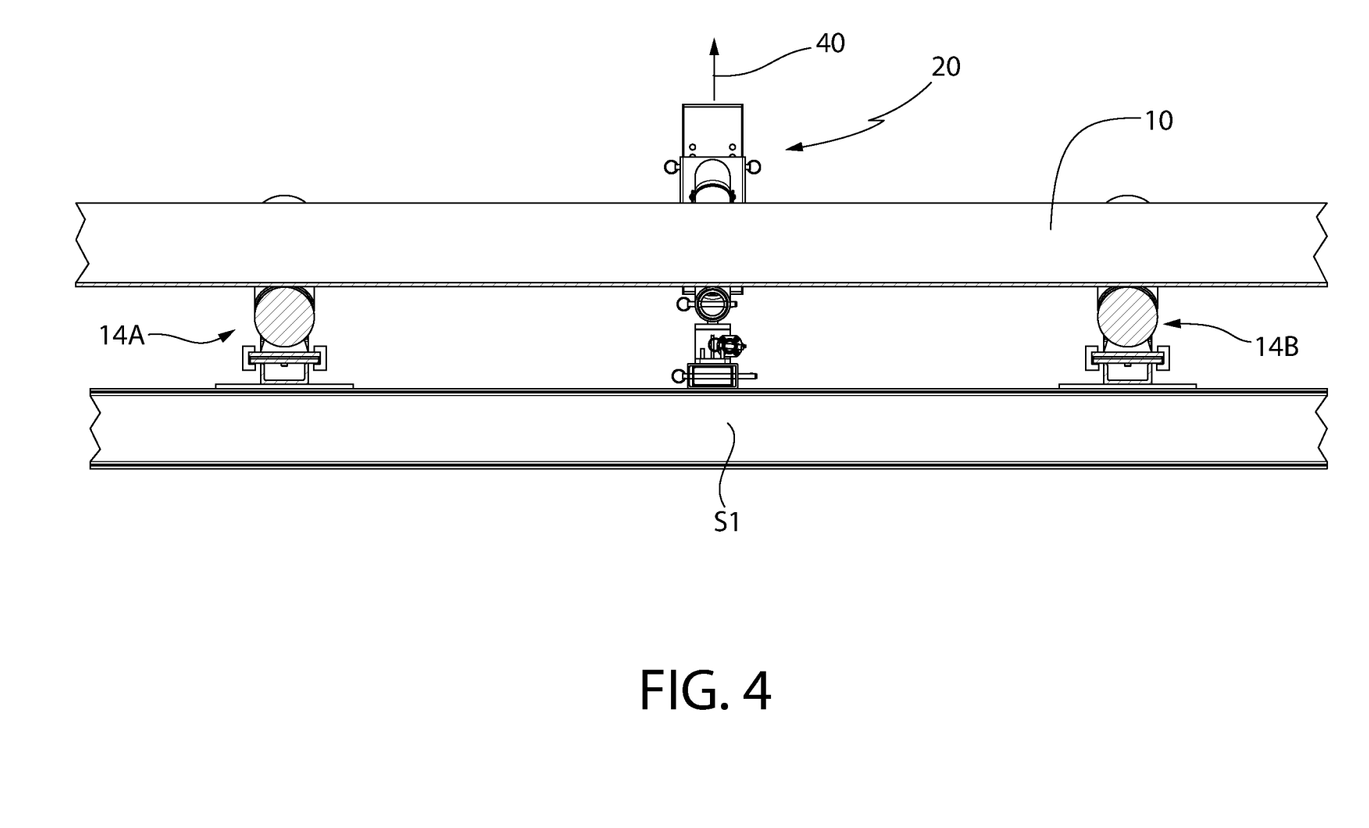
FIG. 4 is a cross-sectional view of the conveyor belt system taken long line 4-4 of FIG. 1 with the manually-adjustable lifter apparatus positioned underneath the conveyor belt and with the conveyor belt support arm in its retracted or lowered position.
Figure 5:
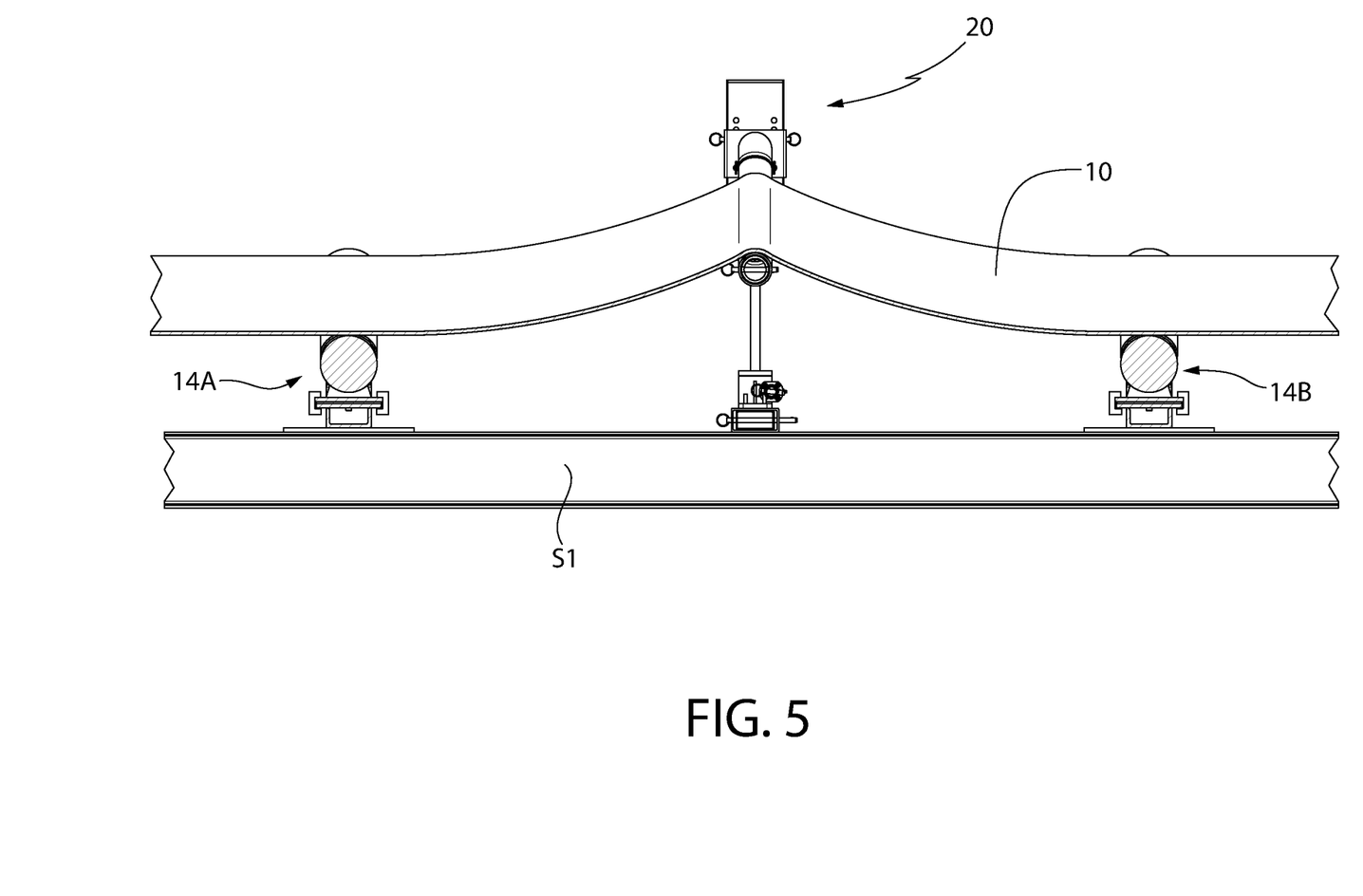
FIG. 5 is a cross-sectional view of the conveyor belt system similar to the view of FIG. 4 but with the conveyor belt support arm shown in its extended or raised position.

When the lifter apparatus 20 is to be used on particular conveyor system 12, the conveyor belt support arm 24, the input shaft coupler 26 and the base 30 are all adjusted using the plurality of segments, the connectors 25A/25B and the extenders 36/36B and the quick-release pins 33 described above. Then, as shown in FIG. 1, the lifter apparatus 20 is positioned on the stringers S1 and S2 underneath the conveyor belt 10 and in between conventional conveyor belt idlers 14A and 14B. If a gap G appears between the conveyor belt 10 and the conveyor belt support arm 24 (FIG. 11), the operator can vertically adjust the connectors 25A/25B to eliminate that gap G. With the lifter apparatus 20 in position and in full contact with the conveyor belt support arm 24, as also shown in FIG. 4, the tool 28 is engaged with the drive screw 37A-DS or 37B-DS and then rotated in the direction of arrow 38 (see FIG. 2) to raise the conveyor belt 10 in the direction of arrow 40. FIG. 5 depicts the conveyor belt 10 in a raised condition where maintenance can then be performed on the conveyor belt 10 and/or conveyor system 12 or parts thereof. Conversely, when the work is complete, the tool 28 can be reengaged with either drive screw 37A-DS or 37B-DS and rotated in the direction opposite to the arrow 38 to lower the conveyor belt 10 to its operational position and completely back onto the idlers 14A/14B. If necessary, the connectors 25A/25B can also be adjusted downward (in the direction opposite to arrows 60 in FIG. 11) to reestablish a gap G to provide additional clearance in removing the lifter apparatus 20 from under the conveyor belt 10. The lifter apparatus 20 can be then removed from underneath the conveyor belt 10 and off the stringers S1 and S2.

It should be further understood that the plurality of apertures A and vertically-aligned apertures VA, are, as mentioned above, at predetermined increments. By way of example only, these predetermined increments may comprise, but are not limited to, the following:

Vertical apertures VA may be separated at 1 inch intervals;

Apertures A on the input shaft coupler 26 central element 58 may be separated at 3 inch intervals;

Apertures A on the base sleeves 30A/30B of the portions that rest on the stingers S1/S2 may be separated at 1.50 inch intervals while the apertures A on the base sleeves 30A/30B inward portions may be separated at 2.81 in intervals;

Apertures A on the angled portions of the elbow elements 42A/42B of the conveyor belt support arm 24 may be separated at 2.25 in intervals while the apertures A on the horizontal portions of these elements may be separated at 1.25 in intervals.

While the invention has been described in detail and with reference to specific examples thereof, it will be apparent to one skilled in the art that various changes and modifications can be made therein without departing from the spirit and scope thereof.

What is claimed is:

1. An apparatus for lifting a portion of trough-shaped conveyor belts of different widths when each trough-shaped conveyor belt is installed in a conveyor system, said apparatus comprising:

a conveyor belt support arm for receiving a trough-shaped conveyor belt thereon, said conveyor belt support arm having a length that is manually-adjustable for accommodating trough-shaped conveyor belts of different widths, said conveyor belt support arm having end portions;

a pair of lifts wherein a respective lift is coupled to a respective end portion of said conveyor belt support arm for raising or lowering said conveyor belt support arm;

a shaft coupler connected between said pair of lifts for permitting activation of one of said pair of lifts to activate the other one of said pair of lifts simultaneously so that said lifts raise or lower together, said shaft coupler being manually-adjustable;

a base to which said pair of lifts is coupled, said base being manually-adjustable to rest on a portion of the conveyor system.

2. The apparatus of claim 1 wherein said conveyor belt support arm comprises a plurality of segments that that can be displaced and releasably secured together at predetermined increments for manually-adjusting said length.

3. The apparatus of claim 1 wherein said base comprises a pair of displaceable sleeves each of which is slideably engaged on a respective end of a base bar, and wherein said respective one of said pair of lifts is secured to a top portion of a respective sleeve.

* * * * *